United States Patent
Ishihara

(10) Patent No.: US 11,165,917 B2
(45) Date of Patent: Nov. 2, 2021

(54) INFORMATION PROCESSING APPARATUS, NON-TRANSITORY COMPUTER-READABLE STORAGE MEDIUM STORING INFORMATION PROCESSING PROGRAM, AND INFORMATION PROCESSING METHOD

(71) Applicant: SEIKO EPSON CORPORATION, Tokyo (JP)

(72) Inventor: Masami Ishihara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/079,004

(22) Filed: Oct. 23, 2020

(65) Prior Publication Data

US 2021/0127021 A1 Apr. 29, 2021

(30) Foreign Application Priority Data

Oct. 24, 2019 (JP) .............................. JP2019-193107

(51) Int. Cl.
*G06F 3/12* (2006.01)
*H04N 1/00* (2006.01)

(52) U.S. Cl.
CPC ..... *H04N 1/00408* (2013.01); *H04N 1/00013* (2013.01); *H04N 1/0097* (2013.01); *H04N 1/00477* (2013.01); *H04N 1/00501* (2013.01); *H04N 1/00628* (2013.01); *H04N 1/00811* (2013.01); *H04N 1/00814* (2013.01); *H04N 1/00824* (2013.01)

(58) Field of Classification Search
CPC ........... H04N 1/00408; H04N 1/00013; H04N 1/00018; H04N 1/00477; H04N 1/00501; H04N 1/00628; H04N 1/00811; H04N 1/00814; H04N 1/00824; H04N 1/0097
See application file for complete search history.

(56) References Cited

U.S. PATENT DOCUMENTS

| | | | |
|---|---|---|---|
| 2011/0125937 A1* | 5/2011 | Ito | H04N 1/00241 710/36 |
| 2018/0032018 A1* | 2/2018 | Takatou | G03G 15/70 |
| 2019/0132455 A1 | 5/2019 | Miyauchi et al. | |

FOREIGN PATENT DOCUMENTS

JP 2019-083429 5/2019

* cited by examiner

*Primary Examiner* — Moustapha Diaby
(74) *Attorney, Agent, or Firm* — Workman Nydegger

(57) ABSTRACT

An information processing apparatus includes a setting reception section and a posture acquisition section. The information processing apparatus outputs a scan setting to an image reading apparatus including a main body having a plurality of postures. The main body reads a document according to the scan setting. The setting reception section is configured to display a setting item included in the scan setting on a display portion and receive a change in a setting content shown in the setting item. The posture acquisition section acquires posture information indicating the posture of the main body from the image reading apparatus. The setting reception section switches the setting item displayed on the display portion to the setting content according to the posture when the posture indicated by the posture information is switched.

10 Claims, 12 Drawing Sheets

FIG. 1
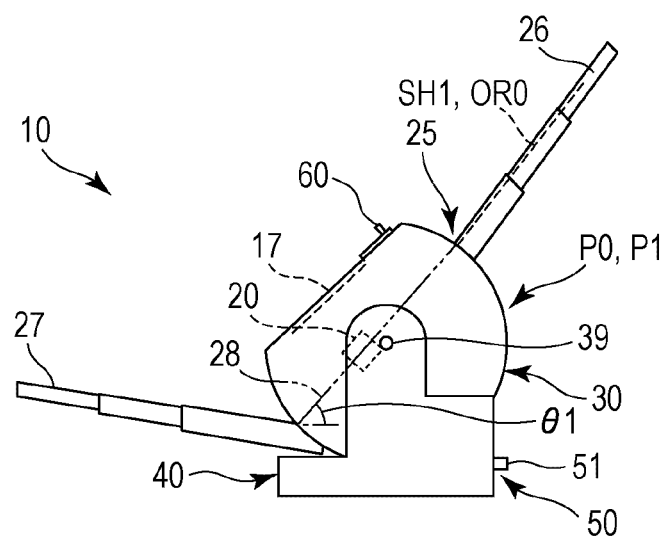
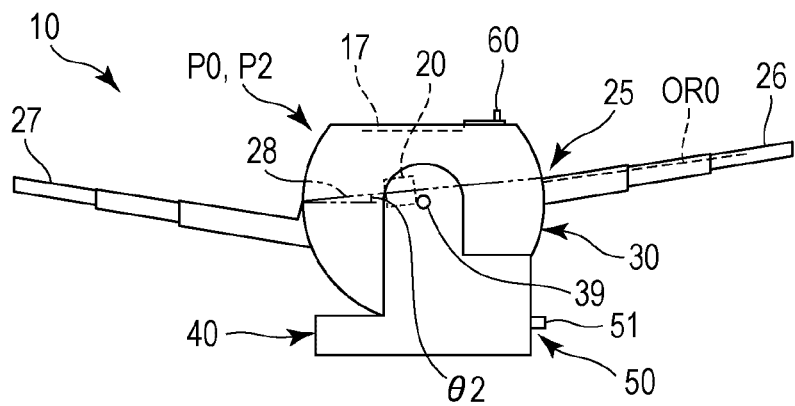

FIG. 2
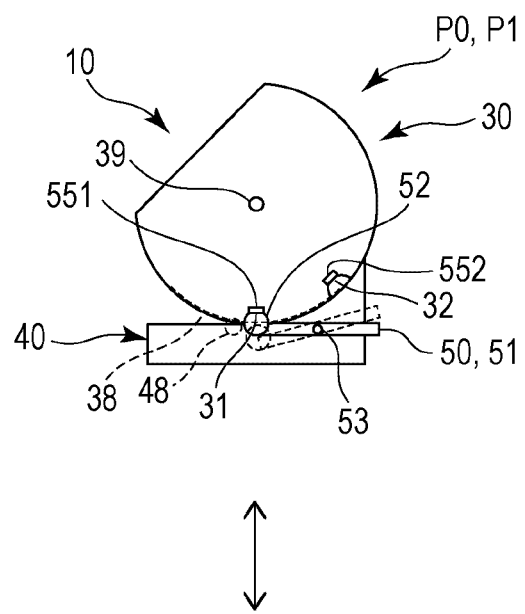
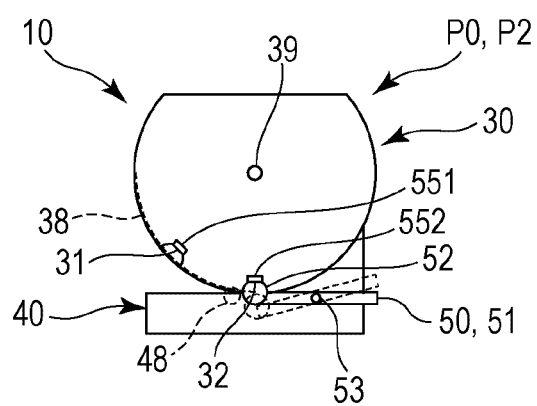

FIG. 6

| | | TILT POSTURE (P1) | FLAT POSTURE (P2) U3 |
|---|---|---|---|
| DOCUMENT WAITING MODE | DEFAULT | OFF | ON (CONTINUOUS) |
| | PREVIOUS SETTING | | |
| DOCUMENT INCLINATION CORRECTION | DEFAULT | OFF | ON |
| | PREVIOUS SETTING | | |
| BORDERLESS | DEFAULT | OFF | ON (WHITE) |
| | PREVIOUS SETTING | | ON (BLACK) |
| DOUBLE FEED DETECTION | DEFAULT | OFF | ON |
| | PREVIOUS SETTING | | |
| ... | DEFAULT | ... | ... |
| | PREVIOUS SETTING | ... | ... |

TA1 ↖ · SE1 ↑ · SE2 ↑

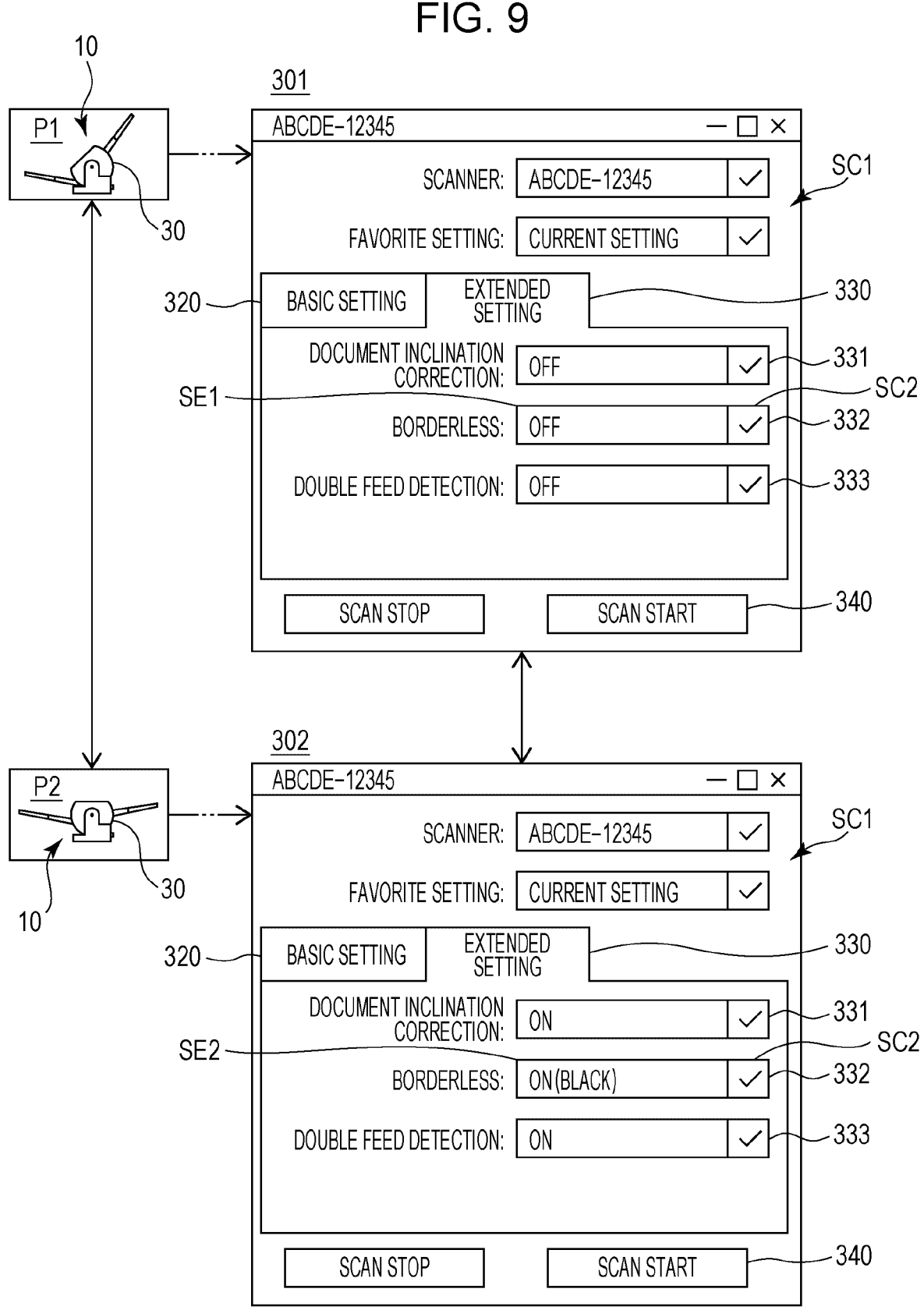

INFORMATION PROCESSING APPARATUS, NON-TRANSITORY COMPUTER-READABLE STORAGE MEDIUM STORING INFORMATION PROCESSING PROGRAM, AND INFORMATION PROCESSING METHOD

The present application is based on, and claims priority from JP Application Serial Number 2019-193107, filed Oct. 24, 2019, the disclosure of which is hereby incorporated by reference herein in its entirety.

BACKGROUND

1. Technical Field

The present disclosure relates to a technology for outputting scan settings to an image reading apparatus including a main body having a plurality of postures.

2. Related Art

An image reading apparatus disclosed in JP-A-2019-83429 can switch a posture of a device main body including a reading unit that reads a medium. The device main body has a first posture in which a feeding tray has a first inclination angle and a second posture in which the feeding tray has a second inclination angle closer to horizontal than the first inclination angle or the feeding tray is horizontal. The first posture in which the inclination angle of the feeding tray is relatively large is a posture suitable for automatically feeding documents one by one from a document bundle because the document bundle set in the feeding tray is positioned by gravity. The second posture in which the inclination angle of the feeding tray is relatively small is a posture in which an operator can easily set the documents one by one on the feeding tray. Therefore, the advantages of the image reading apparatus differ depending on the posture.

When a host computer is coupled to the image reading apparatus, it is conceivable that the scan settings for the image reading apparatus is performed from the host computer. Here, it is assumed that a user interface screen of the scan settings is displayed on a display by installing a scanner driver in the host computer. When a user switches the device main body to the second posture after performing the work of causing the reading unit to read the document in a state where the device main body is in the first posture, the user needs to perform an operation of changing the scan settings on the user interface screen.

SUMMARY

According to an aspect of the present disclosure, there is provided an information processing apparatus that outputs a scan setting to an image reading apparatus including a main body having a plurality of postures. The main body reads a document according to the scan setting. The information processing apparatus includes a setting reception section configured to display a setting item included in the scan setting on a display portion and receive a change in a setting content shown in the setting item, and a posture acquisition section that acquires posture information indicating the posture of the main body from the image reading apparatus. The setting reception section switches the setting item displayed on the display portion to the setting content according to the posture when the posture indicated by the posture information is switched.

According to another aspect of the present disclosure, there is provided a non-transitory computer-readable storage medium storing an information processing program for outputting a scan setting to an image reading apparatus including a main body having a plurality of postures. The main body reads a document according to the scan setting. The information processing program causes a computer to realize a setting reception function of displaying a setting item included in the scan setting on a display portion and receiving a change in a setting content shown in the setting item, and a posture acquisition function of acquiring posture information indicating the posture of the main body from the image reading apparatus. The setting reception function switches the setting item displayed on the display portion to the setting content according to the posture when the posture indicated by the posture information is switched.

According to still another aspect of the present disclosure, there is provided an information processing method executed by a computer to perform processing of outputting a scan setting to an image reading apparatus including a main body having a plurality of postures. The main body reads a document according to the scan setting. The information processing method includes a setting reception step of displaying a setting item included in the scan setting on a display portion and permitting a change in a setting content shown in the setting item to be received, and a posture acquisition step of acquiring posture information indicating the posture of the main body from the image reading apparatus. The setting reception step includes switching the setting item displayed on the display portion to the setting content according to the posture when the posture indicated by the posture information is switched.

BRIEF DESCRIPTION OF THE DRAWINGS

FIG. 1 is a diagram schematically showing an example of an image reading apparatus including a main body in each holding posture.

FIG. 2 is a diagram schematically showing an example of a holding mechanism of the main body.

FIG. 6 is a diagram schematically showing a structural example of a setting table.

FIG. 9 is a diagram schematically showing another example of the UI screen according to the posture of the main body.

DESCRIPTION OF EXEMPLARY EMBODIMENTS

Figure 3:
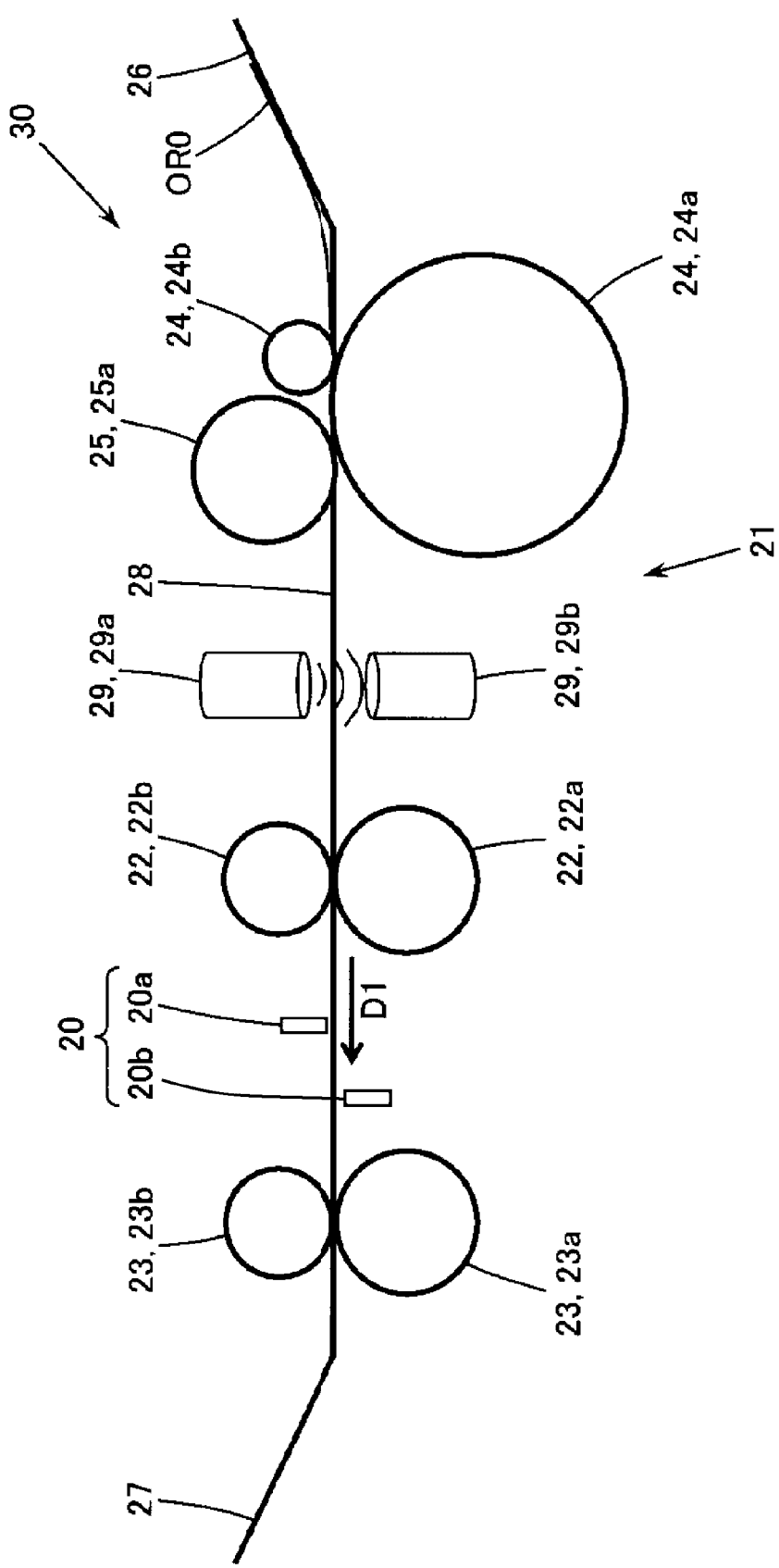
FIG. 3 is a diagram schematically showing an example of a mechanism of the main body.

Hereinafter, embodiments of the present disclosure will be described. Of course, the following embodiments merely exemplify the present disclosure, and not all the features shown in the embodiments are essential to the means for solving the disclosure.

1. Outline of Technology Included in Present Disclosure: first, the outline of the technology included in the present disclosure will be described with reference to the examples shown in FIGS. 1 to 12. It should be noted that the drawings of the present application are diagrams schematically showing examples, the enlargement ratios in the respective directions shown in these drawings may be different, and the drawings may not match. Of course, each element of the present technology is not limited to the specific example indicated by the reference numeral. In the "Outline of Technology Included in Present Disclosure", parentheses mean a supplementary explanation of the immediately preceding word.

Figure 7:
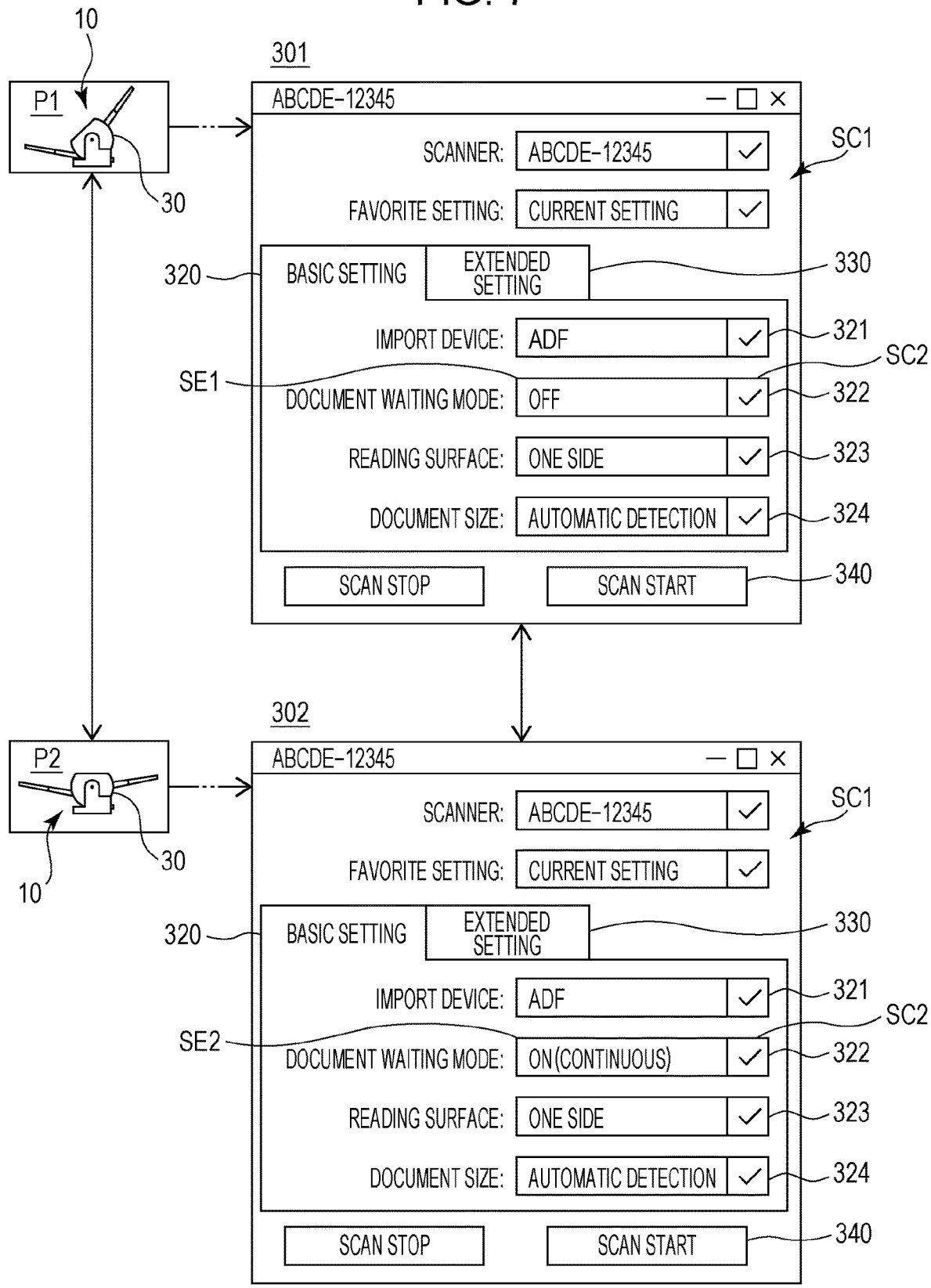
FIG. 7 is a diagram schematically showing an example of a UI screen according to a posture of the main body.
Figure 8:
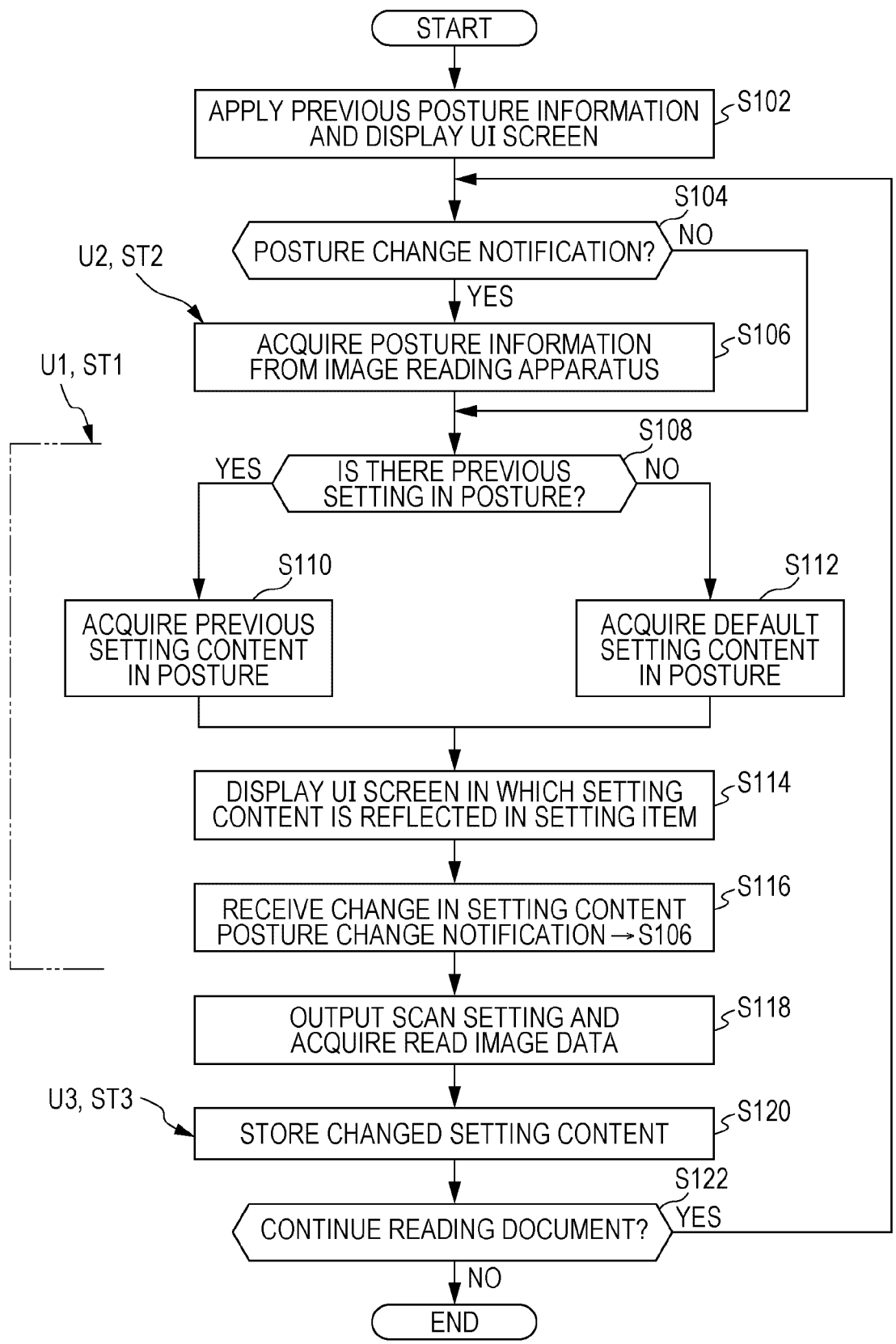
FIG. 8 is a flowchart showing an example of information processing performed by the information processing apparatus.

Aspect 1: an information processing apparatus 100 according to an aspect of the present technology is the information processing apparatus 100 that outputs a scan setting SC1 to an image reading apparatus 10 including a main body 30 that reads a document OR0 according to the scan setting SC1, and includes a setting reception section U1 and a posture acquisition section U2. Here, the main body 30 has a plurality of postures P0, as illustrated in FIGS. 1 and 2. As illustrated in FIG. 7 and the like, the setting reception section U1 can display a setting item SC2 included in the scan setting SC1 on a display portion 200 and receive a change in the setting content shown in the setting item SC2. As illustrated in FIG. 8, the posture acquisition section U2 acquires posture information IM1 indicating the posture P0 of the main body 30 from the image reading apparatus 10. As illustrated in FIG. 7 and the like, the setting reception section U1 switches the setting item SC2 displayed on the display portion 200 to the setting content according to the posture P0 when the posture P0 indicated by the posture information IM1 is switched.

In the above aspect, in the image reading apparatus 10 including the main body 30 having the plurality of postures P0, when the posture P0 of the main body 30 is switched, the display of the scan setting SC1 is switched to an appropriate setting content according to the posture P0. Therefore, according to the above aspect, it is possible to provide a technology capable of easily performing a scan setting according to the posture of the main body.

Here, the image reading apparatus includes a scanner, a facsimile, a multifunction machine having a document reading function and an image data output function, and the like.

The setting item includes a selection item for selecting any one from a plurality of setting contents, a setting item for setting a numerical value from a numerical range as the setting contents, and the like.

The setting item may include a plurality of items. Further, the scan settings may include items that do not depend on the posture of the main body.

The above-mentioned remarks also apply to the following aspects.

Aspect 2: as illustrated in FIG. 6 and the like, the information processing apparatus 100 may further include a setting storage section U3 that stores the setting content according to the posture P0 indicated by the posture information IM1, which is shown in the setting item SC2. The setting reception section U1 may switch the setting item SC2 displayed on the display portion 200 to the setting content according to the posture P0, which is stored in the setting storage section U3 when the posture P0 indicated by the posture information IM1 is switched. According to the present aspect, when the posture P0 of the main body 30 is switched, the setting content according to the posture P0, which is stored in the setting storage section U3 is displayed. Accordingly, it is possible to provide a suitable technology for easily performing a scan setting according to the posture of the main body.

Aspect 3: in addition, as illustrated in FIGS. 1 and 2, the plurality of postures P0 may include a first posture (for example, a tilt posture P1) and a second posture (for example, a flat posture P2) different in inclination (for example, inclination angles θ1 and θ2) from the first posture (P1). The information processing apparatus 100 may further include the setting storage section U3. As illustrated in FIG. 6, the setting storage section U3 stores the setting content shown in the setting item SC2 as a first setting SE1 when the posture information IM1 indicates the first posture (P1), and stores the setting content shown in the setting item SC2 as a second setting SE2 when the posture information IM1 indicates the second posture (P2). As illustrated in FIG. 8, the setting reception section U1 may display the setting item SC2 indicating the first setting SE1 on the display portion 200 when the posture information IM1 indicates the first posture (P1). The setting reception section U1 may switch the setting item SC2 displayed on the display portion 200 from the first setting SE1 to the second setting SE2 when the posture P0 indicated by the posture information IM1 is switched from the first posture (P1) to the second posture (P2).

In the above aspect, in the image reading apparatus 10 including the main body 30 whose inclination can be changed, when the main body 30 is switched from the first posture (P1) to the second posture (P2), the display of the scan setting SC1 is switched to an appropriate setting content as the second posture (P2). Therefore, according to the above aspect, it is possible to provide a technology capable of easily performing a scan setting according to the inclination of the main body.

Here, the main body may have a plurality of postures with different inclinations, and may have a third posture with a different inclination from both the first posture and the second posture, for example. When the main body has the third posture, the setting content may include a third setting in addition to the first setting and the second setting. In the present application, "first", "second", . . . are terms for identifying each component, and do not mean order.

The above-mentioned remarks also apply to the following aspects.

Aspect 4: as illustrated in FIG. 3 and the like, the main body 30 may include a reading section 20 that reads the document OR0, and a document transport section 21 that transports the document OR0 to the reading section 20 along a transport path 28 passing through the reading section 20. The second posture (P2) may have a smaller inclination angle of the transport path 28 than the first posture (P1). As illustrated in FIG. 7 and the like, the setting item SC2 may include, as the second setting SE2, a document waiting item 322 indicating that the document transport section 21 continues to be driven. The setting reception section U1 may switch the document waiting item 322 displayed on the display portion 200 from the first setting SE1 to the second setting SE2 when the posture P0 indicated by the posture information IM1 is switched from the first posture (P1) to the second posture (P2).

In the second posture (P2) in which the transport path 28 has a small inclination angle, there are many cases where the document waiting item 322 is set to the second setting SE2 in which the document transport section 21 continues to be driven. On the other hand, in the first posture (P1) in which the transport path 28 has a large inclination angle, there are many cases where the document waiting item 322 is set to the first setting SE1 different from the second setting SE2. Therefore, according to the above aspect, it is possible to provide a technology for switching the document waiting item to a preferable setting content according to the inclination of the main body.

Figure 11:
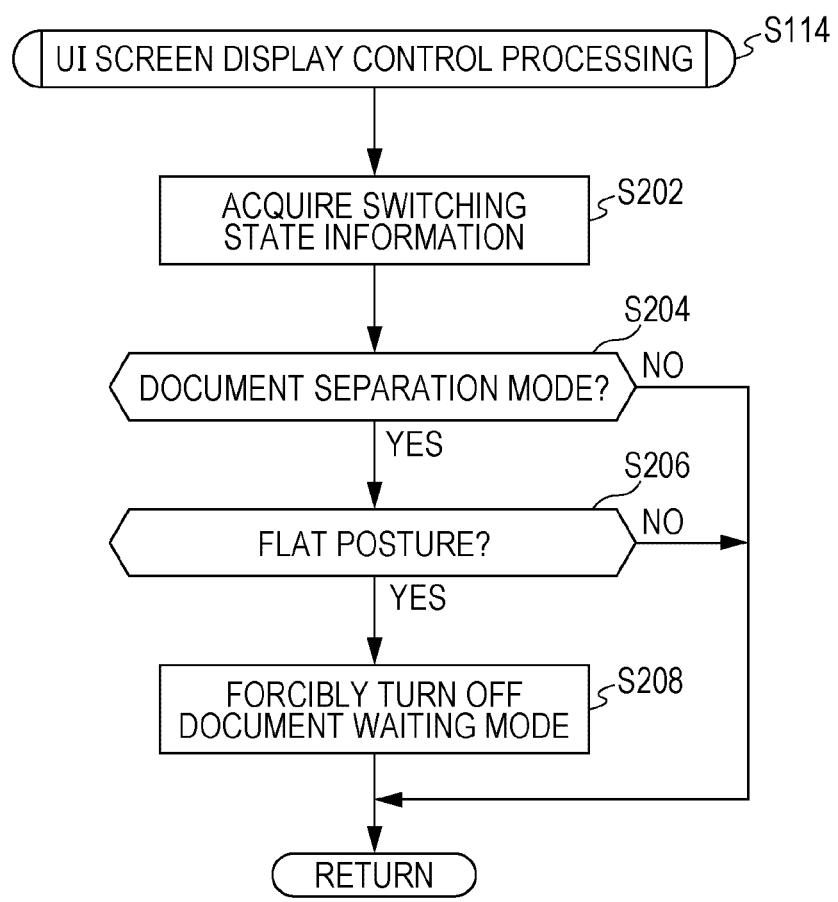
FIG. 11 is a flowchart showing an example of UI screen display control processing performed by the information processing apparatus.
Figure 12:
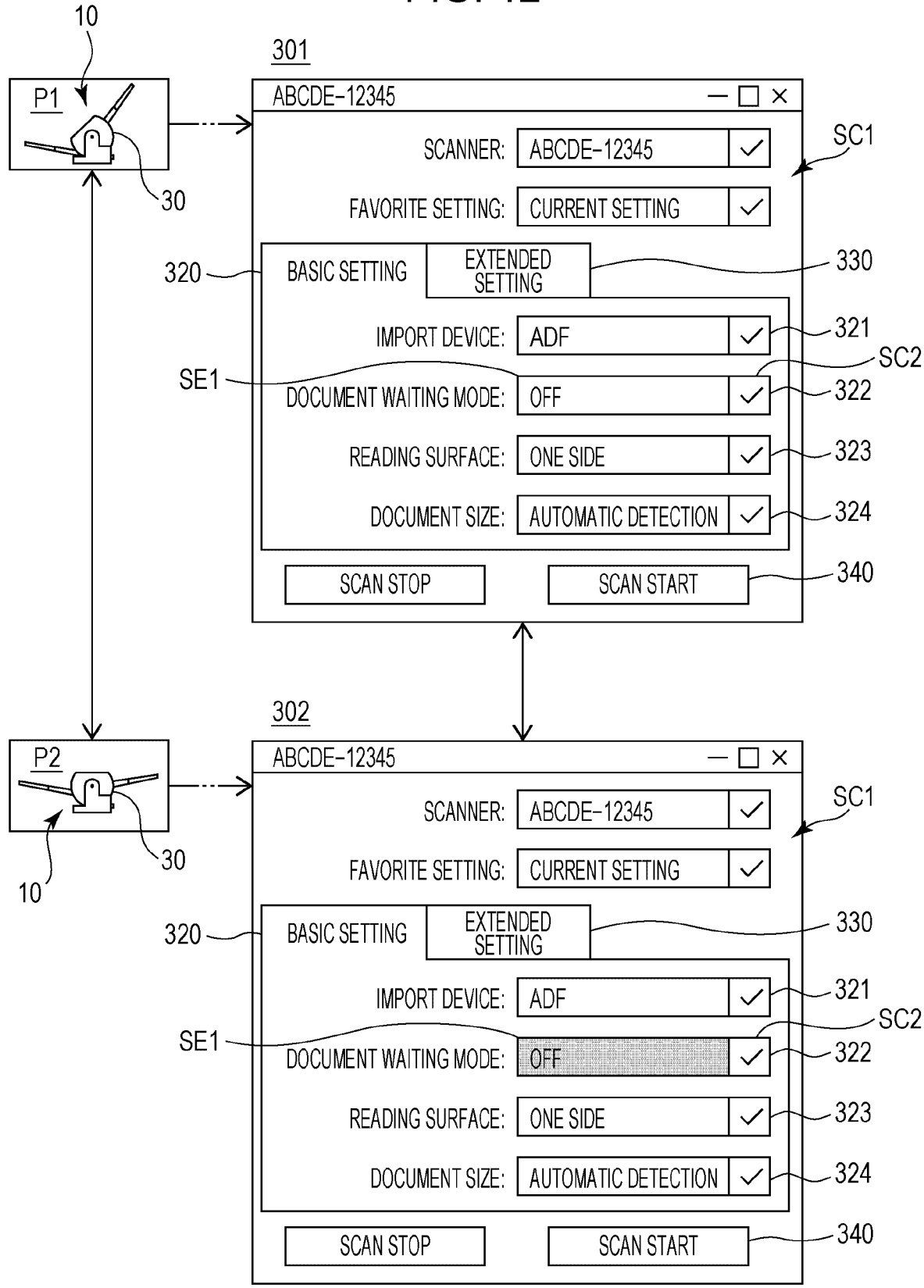
FIG. 12 is a diagram schematically showing another example of the UI screen according to the posture of the main body.

Aspect 5: as illustrated in FIG. 3 and the like, the main body 30 may further include a feeding tray 26, a document separating section 25 that performs an operation of separating the document OR0 from a document bundle SH1 supported by the feeding tray 26, and an operation switching section 60 that switches whether or not to operate the document separating section 25. As illustrated in FIGS. 11 and 12, the setting reception section U1 may acquire switching state information IM2 indicating a state of the operation switching section 60 from the image reading apparatus 10, and prohibit the document waiting item 322 from being set to the second setting SE2 when the state indicated by the switching state information IM2 indicates that the document separating section 25 is operated, and the posture P0 indicated by the posture information IM1 is the second posture (P2).

In the second setting SE2 in which the document transport section 21 continues to be driven, there is a case where the document OR0 that is easily torn is handled. Since such a document OR0 is easily torn when the document separating section 25 operates, it is preferable that the document waiting item 322 is not set to the second setting SE2 when the document separating section 25 operates. Therefore, according to the above aspect, it is possible to provide a technology preferable when the main body of the image reading apparatus includes the operation switching section that switches whether or not to operate the document separating section.

Aspect 6: as illustrated in FIG. 3 and the like, the main body 30 may include the reading section 20 that reads the document OR0 to generate read image data DA1, and the document transport section 21 that transports the document OR0 to the reading section 20 along the transport path 28 passing through the reading section 20. The second posture (P2) may have a smaller inclination angle of the transport path 28 than the first posture (P1). As illustrated in FIG. 9, the setting item SC2 may include, as the second setting SE2, an inclination correction item 331 indicating that the inclination of the read image data DA1 is corrected. The setting reception section U1 may switch the inclination correction item 331 displayed on the display portion 200 from the first setting SE1 to the second setting SE2 when the posture P0 indicated by the posture information IM1 is switched from the first posture (P1) to the second posture (P2).

In the second posture (P2) in which the transport path 28 has a small inclination angle, the document OR0 is relatively highly likely to be fed with an inclination, and therefore, there are many cases where the inclination correction item 331 is set to the second setting SE2 in which the inclination of the read image data DA1 is corrected. On the other hand, in the first posture (P1) in which the transport path 28 has a large inclination angle, there are many cases where the inclination correction item 331 is set to the first setting SE1 different from the second setting SE2. Therefore, according to the above aspect, it is possible to provide a technology for switching the inclination correction item to a preferable setting content according to the inclination of the main body.

Aspect 7: as illustrated in FIG. 9, the setting item SC2 may include, as the second setting SE2, an edge erasing item 332 indicating that the edge of the read image data DA1 is replaced with a predetermined color. The setting reception section U1 may switch the edge erasing item 332 displayed on the display portion 200 from the first setting SE1 to the second setting SE2 when the posture P0 indicated by the posture information IM1 is switched from the first posture (P1) to the second posture (P2).

In the second posture (P2) in which the transport path 28 has a small inclination angle, the document OR0 is relatively highly likely to be fed with a deteriorated edge, and therefore, there are many cases where the edge erasing item 332 is set to the second setting SE2 in which the edge of the read image data DA1 is replaced with a predetermined color. On the other hand, in the first posture (P1) in which the transport path 28 has a large inclination angle, there are many cases where the edge erasing item 332 is set to the first setting SE1 different from the second setting SE2. Therefore, according to the above aspect, it is possible to provide a technology for switching the edge erasing item to a preferable setting content according to the inclination of the main body.

Aspect 8: as illustrated in FIG. 3 and the like, the main body 30 may include the reading section 20 that reads the document OR0, the document transport section 21 that transports the document OR0 to the reading section 20 along the transport path 28 passing through the reading section 20, and a double feed detection section 29 that detects whether or not another document is overlapped with the document OR0 transported along the transport path 28. The second posture (P2) may have a smaller inclination angle of the transport path 28 than the first posture (P1). As illustrated in FIG. 9, the setting item SC2 may include, as the second setting SE2, a double feed detection item 333 indicating that the double feed detection section 29 functions. The setting reception section U1 may switch the double feed detection item 333 displayed on the display portion 200 from the first setting SE1 to the second setting SE2 when the posture P0 indicated by the posture information IM1 is switched from the first posture (P1) to the second posture (P2).

In the second posture (P2) in which the transport path 28 has a small inclination angle, the documents OR0 are relatively highly likely to be fed in a state of being adhered to each other, and therefore, there are many cases where the double feed detection item 333 is set to the second setting SE2 in which the double feed detection section 29 functions. Therefore, according to the above aspect, it is possible to provide a technology for switching the double feed detection item to a preferable setting content according to the inclination of the main body.

Aspect 9: incidentally, an information processing program PR0 according to an aspect of the present technology causes a computer (for example, the information processing apparatus 100) to realize a setting reception function FU1 corresponding to the setting reception section U1 and a posture acquisition function FU2 corresponding to the posture acquisition section U2. Also in the present aspect, it is possible to provide a technology capable of easily performing a scan setting according to the posture of the main body. The information processing program PR0 may cause the computer (100) to realize a setting storage function FU3 corresponding to the setting storage section U3.

Aspect 10: further, an information processing method according to an aspect of the present technology includes a setting reception step ST1 corresponding to the setting reception section U1 and a posture acquisition step ST2 corresponding to the posture acquisition section U2. Also in the present aspect, it is possible to provide a technology capable of easily performing a scan setting according to the posture of the main body. The information processing method may include a setting storage step ST3 corresponding to the setting storage section U3.

Furthermore, the present technology can be applied to an image reading system including an information processing apparatus and an image reading apparatus, a control method of the image reading system, a control program for the image reading system, a computer-readable medium in which any one of the programs described above is recorded, and the like. The information processing apparatus may be composed of a plurality of distributed parts.

Figure 4:
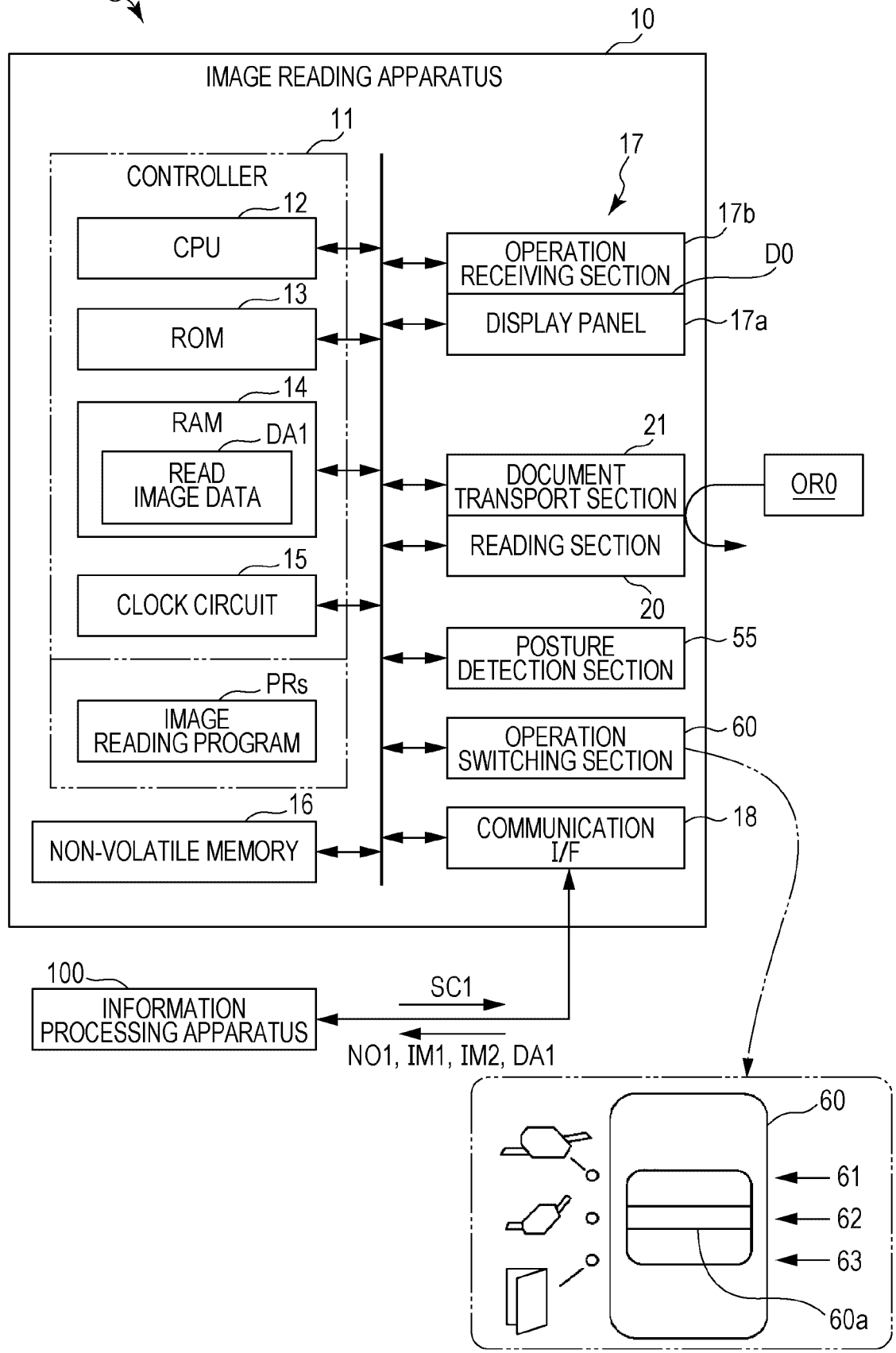
FIG. 4 is a block diagram schematically showing a configuration example of the image reading apparatus.

2. Specific Example of Image Reading Apparatus: FIG. 1 schematically illustrates an image reading apparatus 10 including a main body 30 that can take a plurality of postures P0 having different inclinations. The image reading apparatus 10 shown in FIG. 1 is a document scanner having an automatic paper feeding mechanism. FIG. 2 schematically illustrates a holding mechanism of the main body 30. FIG. 3 schematically illustrates a mechanism of the main body 30. FIG. 4 schematically illustrates a configuration of an image reading system SY1 including the image reading apparatus 10. In the lower portion of FIG. 4, an enlarged view of an operation switching section 60 on the front surface of the main body 30 is shown. The image reading system SY1 illustrated in FIG. 4 includes the image reading apparatus 10 and an information processing apparatus 100.

As shown in FIGS. 1 and 2, the image reading apparatus 10 includes the main body 30 that reads a document OR0 according to a scan setting SC1, a support portion 40 of the main body 30, and a posture switching section 50 of the main body 30. The main body 30 includes a reading section 20 that reads the document OR0 to generate read image data DA1, and a document transport section 21 that transports the document OR0 to the reading section 20 along a transport path 28 passing through the reading section 20, and performs a scanning operation of sequentially reading the plurality of the documents OR0. The support portion 40 supports the main body 30. The posture switching section 50 can switch the main body 30 to the plurality of postures P0 having different inclinations. The plurality of postures P0 shown in FIGS. 1 and 2 include a tilt posture P1 in which an average inclination angle θ1 of the transport path 28 with respect to the horizontal plane is relatively large, and a flat posture P2 in which an average inclination angle θ2 of the transport path 28 with respect to the horizontal plane is relatively small. Here, the tilt posture P1 is an example of the first posture, and the flat posture P2 is an example of the second posture. The flat posture P2 may be a posture that satisfies 0≤θ2<θ1 and may be θ2=0, that is, a completely horizontal posture, or may be an inclined posture if the posture is closer to horizontal than the tilt posture P1. The tilt posture P1 is a posture suitable for automatically feeding the documents OR0 one by one from a document bundle SH1 set on a feeding tray 26. The flat posture P2 is a posture suitable for reading a document such as thin paper, which has a low feeding accuracy in the feeding tray 26 having a steep inclination. The flat posture P2 is also a posture suitable for the operator to manually separate the documents one by one from the document bundle placed near the image reading apparatus 10 and set them on the feeding tray 26.

As shown in FIG. 2, the main body 30 including the reading section 20 and the document transport section 21 has lock holes 31 and 32, a rack 38, and position sensors 551 and 552, and is supported so as to be tiltable with respect to the support portion 40 about a rotation shaft 39. The position sensors 551 and 552 are examples of a posture detection section 55 shown in FIG. 4. When a lock arm 52 of the posture switching section 50 enters either one of the lock holes 31 and 32, the main body 30 is held in any one of the plurality of holding postures P0. When the lock arm 52 enters the first lock hole 31, the main body 30 is held in the tilt posture P1. When the lock arm 52 enters the second lock hole 32, the main body 30 is held in the flat posture P2. The rack 38 meshes with a pinion 48 of the support portion 40. The rack mechanism including the rack 38 and the pinion 48 has a function of smoothly tilting the main body 30 about the rotation shaft 39. The position sensors 551 and 552 are arranged in the lock holes 31 and 32, respectively. The first position sensor 551 present in the first lock hole 31 detects whether or not the main body 30 is locked in the tilt posture P1. The second position sensor 552 present in the second lock hole 32 detects whether or not the main body 30 is locked in the flat posture P2. As the position sensors 551 and 552, a non-contact sensor such as an optical sensor or a magnetic sensor, a contact sensor such as a limit switch, or the like can be used.

The reading section 20 includes a light source that irradiates the document OR0 on the transport path 28 with light, image sensors 20a and 20b that perform photoelectric conversion, a light receiving optical system that guides reflected light from the document OR0 to the image sensors 20a and 20b, an analog-digital conversion section that converts analog electric signals output from the image sensors 20a and 20b into a digital pixel value group, an image data storage processor that stores the read image data DA1 based on the pixel value group in a RAM 14, and the like. In the reading section 20 shown in FIG. 1, the front surface image sensor 20a reads the front surface of the document OR0, and the back surface image sensor 20b reads the back surface of the document OR0. When the light reflected from an object appearing on the document OR0 is converted into an electric signal by the image sensors 20a and 20b through the light receiving optical system, the read image data DA1 based on the pixel value group output from the image sensors 20a and 20b is stored in the RAM 14. Therefore, the read image data DA1 is obtained by reading the document OR0 transported by the document transport section 21, and the read image data DA1 is temporarily stored in the RAM 14. In this way, the reading section 20 reads the document OR0 to generate the read image data DA1.

As shown in FIG. 3, the document transport section 21 includes the feeding tray 26, a paper feed roller pair 24, a document separating section 25, a double feed detection section 29, a transport roller pair 22, a paper discharge roller pair 23, and a paper discharge tray 27.

The feeding tray 26 is expandable and contractable, and supplies the set document OR0 to the transport path 28. On the feeding tray 26, the document bundle SH1 in which the plurality of documents OR0 are overlapped may be set. The document transport section 21 that continuously feeds the plurality of documents OR0 to the reading section 20 is called an ADF or an automatic paper feeder. Here, ADF is an abbreviation for auto document feeder.

The paper feed roller pair 24 includes a driving paper feed roller 24a which is in contact with one surface of the document OR0, for example, the back surface shown in FIG. 3, and a driven paper feed roller 24b which is in contact with the other surface of the document OR0, for example, the front surface shown in FIG. 3. The paper feed roller pair 24 transports the nipped document OR0 in a transport direction D1 by the rotation of the driving paper feed roller 24a. At this time, the driven paper feed roller 24b is rotated by the movement of the document OR0.

The document separating section 25 includes a separating roller 25a and a pressing mechanism (not shown) that presses the separating roller 25a toward the driving paper feed roller 24a. When the pressing mechanism presses the separating roller 25a toward the driving paper feed roller 24a, the document separating section 25 separates only the lowermost document among the plurality of documents OR0 at the time when the plurality of documents OR0 enter between the driving paper feed roller 24a and the separating roller 25a, and allows the lowermost document to be transported in the transport direction D1. Therefore, the document separating section 25 performs an operation of separating the document OR0 from the document bundle SH1 supported by the feeding tray 26. The document separating section 25 functions when the separating roller 25a is pressed toward the driving paper feed roller 24a, and the document separating section 25 does not function when the separating roller 25a is separated from the driving paper feed roller 24a.

The double feed detection section 29 includes an ultrasonic wave transmitting section 29a facing one surface of the document OR0, for example, the front surface shown in FIG. 3, and an ultrasonic wave receiving section 29b facing the other surface of the document OR0, for example, the back surface shown in FIG. 3. When the ultrasonic wave receiving section 29b receives ultrasonic waves transmitted from the ultrasonic wave transmitting section 29a, the double feed detection section 29 detects whether or not the plurality of documents OR0 are fed from the paper feed roller pair 24 in an overlapping state.

The transport roller pair 22 includes a driving transport roller 22a which is in contact with one surface of the document OR0, for example, the back surface shown in FIG. 3, and a driven transport roller 22b which is in contact with the other surface of the document OR0, for example, the front surface shown in FIG. 3. The transport roller pair 22 transports the nipped document OR0 toward the reading section 20 by the rotation of the driving transport roller 22a. At this time, the driven transport roller 22b is rotated by the movement of the document OR0.

The paper discharge roller pair 23 includes a driving paper discharge roller 23a which is in contact with one surface of the document OR0, for example, the back surface shown in FIG. 3, and a driven paper discharge roller 23b which is in contact with the other surface of the document OR0, for example, the front surface shown in FIG. 3. The paper discharge roller pair 23 transports the nipped document OR0 toward the paper discharge tray 27 by the rotation of the driving paper discharge roller 23a. At this time, the driven paper discharge roller 23b is rotated by the movement of the document OR0.

The paper discharge tray 27 is expandable and contractable, and the set document OR0 discharged from the transport path 28 is placed thereon.

Note that, although the document OR0 is typically paper, it may be a sheet medium such as a synthetic resin sheet. Objects appearing in the document OR0 include characters, photographs, paintings, and the like. Here, a blank sheet may be mixed in the document OR0.

As shown in FIGS. 1 and 2, the support portion 40 includes the pinion 48 that meshes with the rack 38, and supports the main body 30 so as to be tiltable about the rotation shaft 39. A posture switching lever 51 that is tiltable about a lever rotation shaft 53 is attached to the support portion 40. One end of the posture switching lever 51 extends from the support portion 40, and the above-described lock arm 52 is fixed to the other end of the posture switching lever 51. A force is applied to the posture switching lever 51 in a direction of pushing the lock arm 52 toward the main body 30 by an elastic mechanism (not shown). The lock arm 52 enters the first lock hole 31 when the main body 30 is in the tilt posture P1, and enters the second lock hole 32 when the main body 30 is in the flat posture P2. When a user raises one end of the posture switching lever 51 with a finger, the lock arm 52 is disengaged from the lock holes 31 and 32, and the main body 30 can be tilted. When the lock arm 52 is not in any of the lock holes 31 and 32, the main body 30 is in an indefinite state in which it can be tilted, which is not in any of the plurality of postures P0.

The image reading apparatus 10 shown in FIG. 4 includes, as an electric system, a CPU 12 which is a processor, a ROM 13 which is a semiconductor memory, the RAM 14 which is a semiconductor memory, a clock circuit 15, a non-volatile memory 16, an operation panel 17, the reading section 20, the document transport section 21, the posture detection section 55, the operation switching section 60, and a communication interface 18. Here, the CPU is an abbreviation for central processing unit, the ROM is an abbreviation for read only memory, the RAM is an abbreviation for random access memory, and the I/F shown in FIG. 4 is an abbreviation for interface. An image reading program PRs that causes the computer to function as the image reading apparatus 10 is stored in at least one of the ROM 13 and the non-volatile memory 16, and is executed by the CPU 12. The CPU 12 executes the image reading program PRs while using the RAM 14 as a work area, thereby performing various kinds of processing such as control processing of the operation panel 17, control processing of the reading section 20, control processing of the document transport section 21, and output processing of the read image data DA1 which is read data of the document OR0. The elements 12 to 15 described above are examples of a controller 11. The processor configuring the controller 11 is not limited to one CPU, and may be a plurality of CPUs, a hardware circuit such as an ASIC, a combination of a CPU and a hardware circuit, or the like. Here, ASIC is an abbreviation for application specific integrated circuit. The RAM 14 includes a buffer that temporarily stores the read image data DA1.

As the non-volatile memory 16, a semiconductor memory such as a flash memory, a magnetic recording medium such as a hard disk, or the like can be used. When the non-volatile memory 16 stores the image reading program PRs, it becomes a computer-readable medium in which the image reading program PRs is recorded.

The operation panel 17 includes a display panel 17a that displays a screen D0, and an operation receiving section 17b that receives an operation on the screen D0. A display panel such as a liquid crystal panel can be used as the display panel 17a. As the operation receiving section 17b, a touch panel attached to the front surface of the display panel 17a, a hard key including a keyboard, or the like can be used. The operation panel 17 is disposed on the front surface of the main body 30 together with the operation switching section 60.

As shown in the lower portion of FIG. 4, the operation switching section 60 includes an operation selection switch 60a capable of switching to switching positions 61 to 63. When the operation selection switch 60a is in the first switching position 61, the operation of the document transport section 21 is adjusted to the flat posture P2, and the document separating section 25 functions. When the operation selection switch 60*a* is in the second switching position 62, the operation of the document transport section 21 is adjusted to the tilt posture P1, and the document separating section 25 functions. When the operation selection switch 60*a* is in the third switching position 63, the document separating section 25 does not function. This is to prevent the document from being torn due to the document separating section 25 functioning on the document that is easily torn.

As described above, the operation switching section 60 switches whether or not to operate the document separating section 25.

The communication interface 18 transmits and receives data to and from the information processing apparatus 100 connected in a wired or wireless manner according to a predetermined communication protocol. The communication interface 18 receives the scan setting SC1 and the like from the information processing apparatus 100, and transmits a posture change notification N01, posture information IM1, switching state information IM2, the read image data DA1, and the like to the information processing apparatus 100. Here, when the posture detection section 55 detects that the posture P0 of the main body 30 is switched, the image reading apparatus 10 transmits the posture change notification NO1 to the information processing apparatus 100, and transmits posture information IM1 indicating the posture P0 detected by the posture detection section 55 to the information processing apparatus 100. The image reading apparatus 10 acquires the state of the operation switching section 60, specifically, the state indicating the position of the operation selection switch 60*a* from the operation switching section 60 in response to a request from the information processing apparatus 100, and transmits the switching state information IM2 indicating the position of the operation selection switch 60*a* to the information processing apparatus 100. Further, when the read image data DA1 is generated, the image reading apparatus 10 transmits the read image data DA1 to the information processing apparatus 100.

The connection between the communication interface 18 and the information processing apparatus 100 may be a network connection such as a LAN or the Internet, or a local connection such as a USB connection. Here, LAN is an abbreviation for local area network, and USB is an abbreviation for universal serial bus.

The main body 30 of the image reading apparatus 10 reads the document OR0 according to the received scan setting SC1.

When the scan setting SC1 includes the setting content that the document transport section 21 continues to be driven, the controller 11 causes the document transport section 21 to continue to be driven.

Figure 10A:
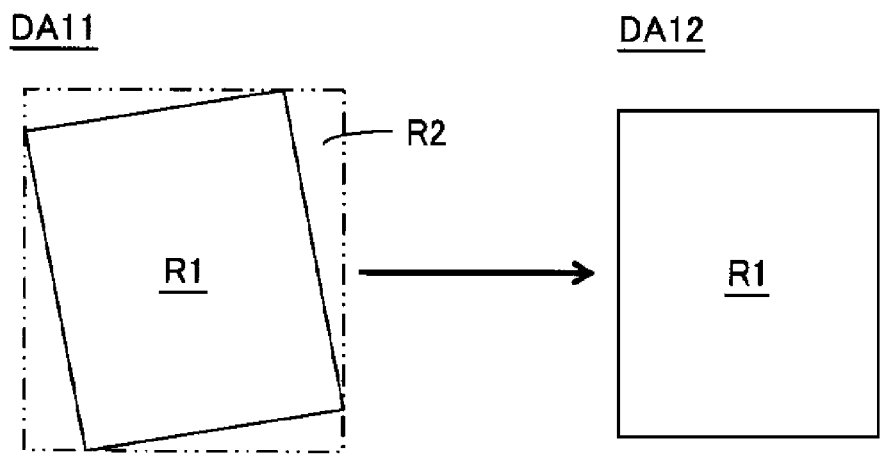
FIG. 10A is a diagram schematically showing an example of document inclination correction.

When the scan setting SC1 includes the setting content that the inclination of the read image data DA1 is corrected, the controller 11 performs a known process of correcting the inclination of the read image data DA1. FIG. 10A shows an example of correcting the inclination of the read image data DA1. When the document OR0 is inclined and supplied to the reading section 20, original data DA11 to be the read image data DA1 includes an area R1 of the inclined document OR0, and an area R2 around the area R1 and outside the document. The area R1 of the document OR0 is usually rectangular. Therefore, the controller 11 may extract the rectangular area R1 of the document OR0 included in the original data DA11 and the inclination angle of the area R1 by image analysis, and perform a rotation process of correcting the inclination angle on the rectangular area R1. Correction data DA12 after the rotation process is the read image data DA1 whose inclination has been corrected.

Figure 10B:
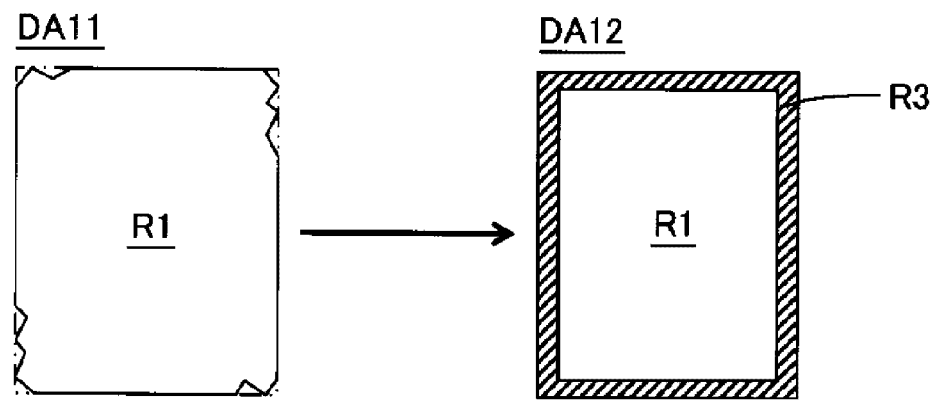
FIG. 10B is a diagram schematically showing an example of edge erasing.

When the scan setting SC1 includes the setting content that the edge of the read image data DA1 is replaced with a predetermined color, the controller 11 performs a known process of replacing the edge of the read image data DA1 with a predetermined color, for example, white or black. FIG. 10B shows an example of replacing the edge of the read image data DA1 with a predetermined color. The document OR0 whose edge is deteriorated, such as a portion of the edge of the document OR0 missing due to aging, may be supplied to the reading section 20. In this case, the original data DA11 to be the read image data DA1 includes the area R1 of the document OR0, and the area R2 around the area R1 and outside the document. Therefore, the controller 11 may perform an edge erasing process of replacing an edge area R3 of the original data DA11 with a predetermined color, for example, white or black. The correction data DA12 after the edge erasing process is the read image data DA1 whose edge has been replaced with the predetermined color.

When the scan setting SC1 includes the setting content that the double feed detection section 29 functions, the controller 11 causes the double feed detection section 29 to function.

The controller 11, the non-volatile memory 16, the operation panel 17, the communication interface 18, the posture detection section 55, and the operation switching section 60 included in the image reading apparatus 10 may be provided in either the main body 30 or the support portion 40, or may be present across the main body 30 and the support portion 40. In the following description, it is assumed that these elements 11, 16, 17, 23, 55, and 60 are provided in the main body 30.

Note that, the image reading apparatus 10 is not limited to a scanner-dedicated machine, and may be a multifunction machine that also has at least a portion of a printing function, a facsimile communication function, an electronic mail transmission function, and the like. Further, the image reading apparatus 10 may have all the components in one housing, but may be composed of a plurality of devices which are communicably divided.

Figure 5:
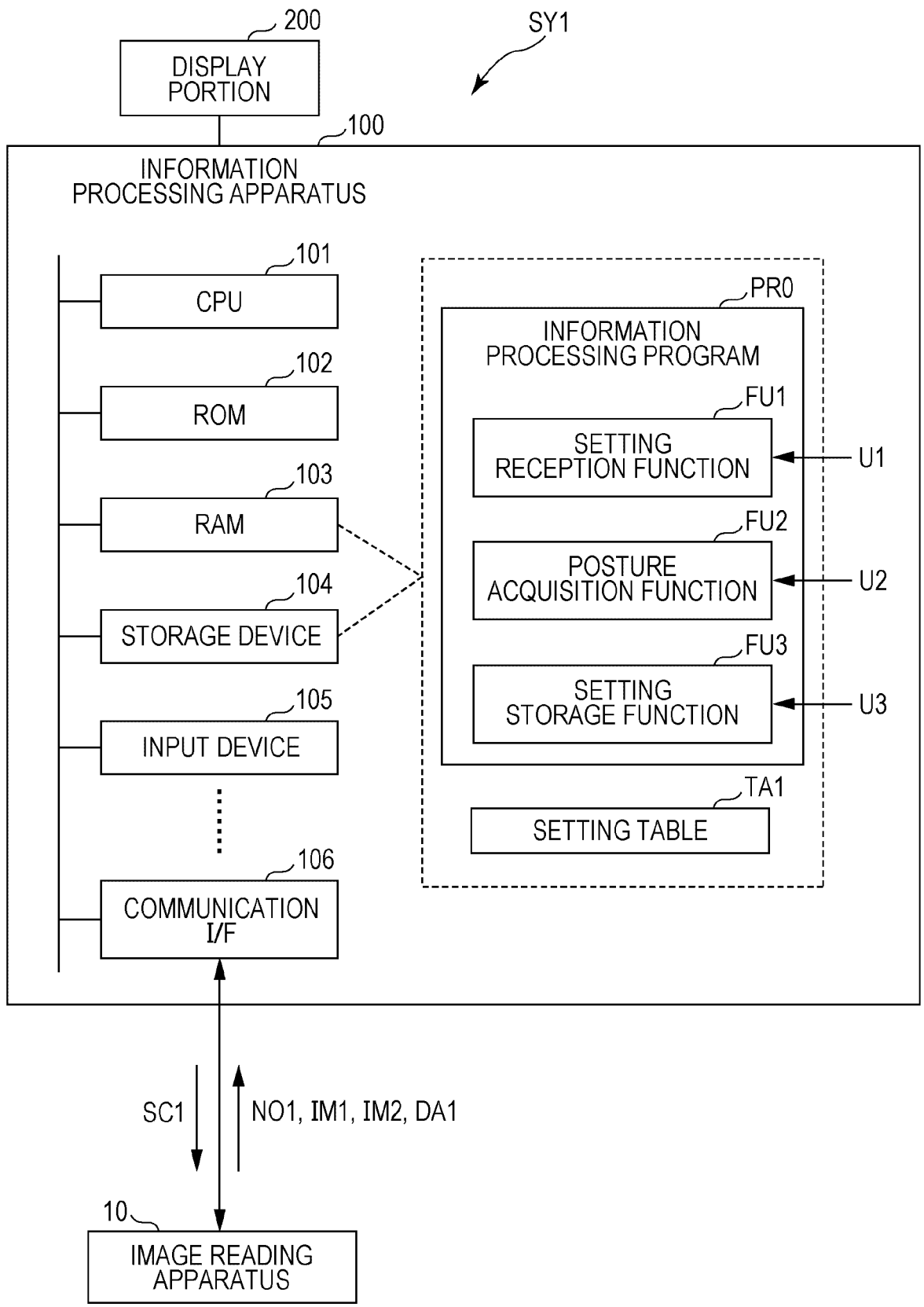
FIG. 5 is a block diagram schematically showing a configuration example of an information processing apparatus.

FIG. 5 schematically illustrates the configuration of the information processing apparatus 100. The information processing apparatus 100 shown in FIG. 5 includes, as an electric system, a CPU 101 which is a processor, a ROM 102 which is a semiconductor memory, a RAM 103 which is a semiconductor memory, a storage device 104, an input device 105, and a communication interface 106. An information processing program PR0 that causes a computer to function as the information processing apparatus 100 is stored in the storage device 104, read by the CPU 101 into the RAM 103, and executed by the CPU 101. The information processing program PR0 is sometimes called driver software for controlling the image reading apparatus 10, and is also called a scanner driver. A plurality of functions realized by the information processing program PR0 in the information processing apparatus 100 include a setting reception function FU1, a posture acquisition function FU2, and a setting storage function FU3. The CPU 101 executes the information processing program PR0 while using the RAM 103 as a work area, thereby causing the information processing apparatus 100 to realize the functions FU1 to FU3 and the like and performing various kinds of processing. Note that, the processor configuring the information processing apparatus 100 is not limited to one CPU, and may be a plurality of CPUs, a hardware circuit such as an ASIC, a combination of a CPU and a hardware circuit, or the like.

The storage device 104 stores a setting table TA1 described later, in addition to the information processing program PR0. The setting table TA1 is appropriately read into the RAM 103. As the storage device 104, a semiconductor memory such as a flash memory, a magnetic recording medium such as a hard disk, or the like can be used. When the storage device 104 stores the information processing program PR0, it becomes a computer-readable medium in which the information processing program PR0 is recorded.

As the input device 105, a pointing device, a hard key including a keyboard, a touch panel attached to the front surface of the display panel, or the like can be used. The communication interface 106 is connected to the communication interface 18 of the image reading apparatus 10 in a wired or wireless manner, and transmits and receives data to and from the image reading apparatus 10 according to a predetermined communication protocol. The communication interface 106 transmits the scan setting SC1 and the like to the image reading apparatus 10, and receives the posture change notification NO1, the posture information IM1, switching state information IM2, the read image data DA1, and the like from the image reading apparatus 10. As described above, the connection between the communication interfaces 106 and 18 may be a network connection such as a LAN or the Internet, or a local connection such as a USB connection.

Note that, the information processing apparatus 100 includes a computer such as a personal computer including a tablet terminal, a mobile phone such as a smartphone, and the like. For example, when a computer body of a desktop personal computer is applied to the information processing apparatus 100, a display portion 200 is usually coupled to the computer body. When the information processing apparatus 100 outputs display data to the display portion 200, the display portion 200 displays a screen according to the display data. Even when a display-integrated computer such as a notebook personal computer is applied to the information processing apparatus 100, the information processing apparatus 100 is still outputting display data to the internal display portion 200. In addition, the information processing apparatus 100 may have all the components in one housing, but may be composed of a plurality of devices which are communicably divided. Further, the present technology can be implemented even when at least a portion of the image reading apparatus 10 is inside the information processing apparatus 100.

Incidentally, in a document scanner with an automatic paper feeding mechanism, there are a product used to automatically feed a plurality of documents together, and a product that is difficult to feed automatically, such as waste paper, and is used to automatically feed a large number of documents one by one by hand. However, it is troublesome for a user who wants to use each application depending on the case, because it is necessary to switch and use each driver software to operate two types of products. One image reading apparatus 10 according to the present specific example can automatically feed a plurality of documents together when the main body 30 is in the tilt posture P1, and automatically feed a large number of documents by hand one by one when the main body 30 is in the flat posture P2.

However, switching and using two types of driver software on one image reading apparatus is troublesome. Further, when only one type of driver software is used, it is also troublesome to change the scan setting SC1 when the posture P0 of the main body 30 is switched. Therefore, in the present specific example, according to the setting table TA1 shown in FIG. 6, the setting contents displayed in the setting items of the scan setting are automatically changed when the posture P0 of the main body 30 is switched.

FIG. 6 schematically illustrates the structure of the setting table TA1. The setting table TA1 stores setting contents of setting items such as "document waiting mode", "document inclination correction", "borderless", and "double feed detection".

The "document waiting mode" corresponds to a document waiting item 322 (see FIG. 7) indicating whether or not the document transport section 21 continues to be driven. The setting content "ON (continuous)" of the "document waiting mode" means that the document transport section 21 continues to be driven. The setting content "OFF" of the "document waiting mode" means that the document transport section 21 does not continue to be driven. Note that, in the flat posture P2, it is assumed that the operator separates the documents one by one from the document bundle placed near the image reading apparatus 10 and places them on the feeding tray 26. Therefore, in the flat posture P2, it is assumed that there are many cases where the "document waiting mode" is set to "ON (continuous)". On the other hand, in the tilt posture P1, it is assumed that the document bundle SH1 is placed on the feeding tray 26. Therefore, in the tilt posture P1, it is assumed that there are many cases where the "document waiting mode" is set to "OFF". Thus, in default settings of the "document waiting mode", a first setting SE1 is set to "OFF" and a second setting SE2 is set to "ON (continuous)".

The "document inclination correction" corresponds to an inclination correction item 331 (see FIG. 9) indicating whether or not to correct the inclination of the read image data DA1. The setting content "ON" of the "document inclination correction" means that the inclination of the read image data DA1 is corrected. The setting content "OFF" of the "document inclination correction" means that the inclination of the read image data DA1 is not corrected. Note that, in the flat posture P2, it is assumed that the document OR0 is highly likely to be inclined and fed by placing the documents one by one on the feeding tray 26 by the operator. Therefore, in the flat posture P2, it is assumed that there are many cases where the "document inclination correction" is set to "ON". On the other hand, in the tilt posture P1, it is assumed that the document OR0 has a small inclination by placing the document bundle SH1 on the feeding tray 26 having a steep inclination. Therefore, in the tilt posture P1, it is assumed that there are many cases where the "document inclination correction" is set to "OFF". Thus, in default settings of the "document inclination correction", the first setting SE1 is set to "OFF" and the second setting SE2 is set to "ON".

The "borderless" corresponds to an edge erasing item 332 (see FIG. 9) indicating whether or not to replace the edge of the read image data DA1 with a predetermined color. The setting content "ON (white)" of the "borderless" means that the edge of the read image data DA1 is replaced with white. The setting content "ON (black)" of the "borderless" means that the edge of the read image data DA1 is replaced with black. The setting content "OFF" of the "borderless" means that the edge of the read image data DA1 is not replaced with a predetermined color. Note that, the document OR0 whose edge is deteriorated, such as a portion of the edge of the document OR0 missing due to aging, may cause a paper jam when the documents are automatically fed together. In the flat posture P2, it is assumed that there is a case where the document OR0 whose edge is deteriorated is placed on the feeding tray 26. Therefore, in the flat posture P2, it is assumed that there are many cases where the "borderless" is set to "ON". On the other hand, in the tilt posture P1, it is assumed that the document OR0 whose edge is deteriorated is less likely to be placed on the feeding tray 26. Therefore, in the tilt posture P1, it is assumed that there are many cases where the "borderless" is set to "OFF". Further, it is assumed that the background color of the document OR0 is often white or a color close to white. Thus, in default settings of the "borderless", the first setting SE1 is set to "OFF" and the second setting SE2 is set to "ON (white)".

The "double feed detection" corresponds to a double feed detection item 333 (see FIG. 9) indicating whether or not to cause the double feed detection section 29 to function. The setting content "ON" of the "double feed detection" means that the double feed detection section 29 functions. The setting content "OFF" of the "double feed detection" means that the double feed detection section 29 does not function. Note that, in the flat posture P2, it is assumed that the operator may place a plurality of documents on the feeding tray 26 without noticing that the documents are adhered to each other. Therefore, in the flat posture P2, it is assumed that there are many cases where the "double feed detection" is set to "ON". On the other hand, in the tilt posture P1, it is assumed that the plurality of documents OR0 in a state where the documents are adhered to each other is less likely to be placed on the feeding tray 26. Therefore, in the tilt posture P1, it is assumed that there are many cases where the "double feed detection" is set to "OFF". Thus, in default settings of the "double feed detection", the first setting SE1 is set to "OFF" and the second setting SE2 is set to "ON".

The setting contents include the first setting SE1 when the main body 30 of the image reading apparatus 10 is in the tilt posture P1 and the second setting SE2 when the main body 30 is in the flat posture P2. Each setting item has a default setting indicated by "default", and when the user changes the setting content, the changed setting content is stored in a "previous setting" of the setting table TA1. For example, in the setting contents of the "borderless" in the setting table TA1, the default first setting SE1 is "OFF", the default second setting SE2 is "ON (white)", and the "previous setting" is "ON (black). Here, "ON (white)" means replacing the edge of the read image data DA1 with white, and "ON (black)" means replacing the edge of the read image data DA1 with black.

FIG. 7 schematically illustrates UI screens 301 and 302 displayed on the display portion 200. Here, UI is an abbreviation for user interface. The first UI screen 301 shown in the upper portion of FIG. 7 is displayed on the display portion 200 when the main body 30 of the image reading apparatus 10 is in the tilt posture P1. The second UI screen 302 shown in the lower portion of FIG. 7 is displayed on the display portion 200 when the main body 30 of the image reading apparatus 10 is in the flat posture P2. The UI screens 301 and 302 show the scan setting SC1. In particular, when the posture P0 of the main body 30 is switched from the tilt posture P1 to the flat posture P2, the setting item SC2 displayed on the display portion 200 is switched from the first setting SE1 to the second setting SE2. When the posture P0 of the main body 30 is switched from the flat posture P2 to the tilt posture P1, the setting item SC2 displayed on the display portion 200 is switched from the second setting SE2 to the first setting SE1. In FIG. 7, the document waiting item 322 is shown as an example of the setting item SC2. It is assumed that the first setting SE1 is "OFF" and the second setting SE2 is "ON (continuous)" as in the "document waiting mode" of the setting table TA1 shown in FIG. 6. In this case, when the posture P0 of the main body 30 is switched from the tilt posture P1 to the flat posture P2, the document waiting item 322 is switched from "OFF" shown in the upper portion of FIG. 7 to "ON (continuous)" shown in the lower portion of FIG. 7. When the posture P0 of the main body 30 is switched from the flat posture P2 to the tilt posture P1, the document waiting item 322 is switched from "ON (continuous)" shown in the lower portion of FIG. 7 to "OFF" shown in the upper portion of FIG. 7.

As described above, when the posture P0 of the main body 30 is switched, the display of the scan setting SC1 is switched to an appropriate setting content according to the posture P0. Therefore, the user can easily perform a scan setting according to the posture P0 of the main body 30.

The UI screens 301 and 302 shown in FIG. 7 have items 321 to 324 displayed when a basic setting tab 320 is selected, a plurality of buttons such as a scan start button 340, and the like. An import device item 321 indicates whether or not to user the ADF. A reading surface item 323 indicates whether to read the document OR0 on one side or on both sides. A document size item 324 indicates whether or not to automatically detect the size of the document OR0, and the size of the document OR0, for example, A3, B4, A4, and the like can be received. The display contents of these items 321, 323, and 324 do not change even though the posture P0 of the main body 30 is switched. In contrast, when the posture P0 of the main body 30 is switched, the document waiting item 322 is switched to the setting content according to the posture P0.

3. Specific Example of Processing Performed by Information Processing Apparatus: FIG. 8 schematically illustrates information processing performed by the information processing apparatus 100. This processing starts when the information processing program PR0 is activated. Here, step S106 corresponds to a posture acquisition section U2, the posture acquisition function FU2, and a posture acquisition step ST2. Steps S108 to S116 correspond to a setting reception section U1, the setting reception function FU1, and a setting reception step ST1. Step S120 and the storage device 104 correspond to a setting storage section U3, the setting storage function FU3, and a setting storage step ST3. Hereinafter, the description of "step" is omitted, and the reference numeral of each step is shown in parentheses.

When the information processing shown in FIG. 8 starts, the information processing apparatus 100 applies the previous posture information IM1 and displays the UI screen as shown in FIG. 7 on the display portion 200 (S102). When the information processing apparatus 100 stores the previous posture information IM1 in the storage device 104, the display of the UI screen can be controlled based on the stored previous posture information IM1. When the previous posture information IM1 indicates the tilt posture P1, the information processing apparatus 100 displays the first UI screen 301 as shown in the upper portion of FIG. 7 on the display portion 200 by referring to the first setting SE1 shown in FIG. 6. When the previous posture information IM1 indicates the flat posture P2, the information processing apparatus 100 displays the second UI screen 302 as shown in the lower portion of FIG. 7 on the display portion 200 by referring to the second setting SE2 shown in FIG. 6.

Here, when the posture P0 of the main body 30 is switched, the image reading apparatus 10 transmits the posture change notification NO1 and the posture information IM1 indicating the current posture P0 to the information processing apparatus 100. Therefore, the information processing apparatus 100 branches the processing depending on whether or not the posture change notification NO1 is received from the image reading apparatus 10 (S104). When the posture change notification NO1 is received, the information processing apparatus 100 acquires the posture information IM1 from the image reading apparatus 10 (S106) and proceeds the processing to S108. When the posture change notification NO1 is not received, the information processing apparatus 100 proceeds the processing to S108 without performing the processing of S106.

In S108, the information processing apparatus 100 branches the processing depending on whether or not there is a previous setting in the posture P0 indicated by the posture information IM1. When there is the previous setting, the information processing apparatus 100 acquires the setting content of the "previous setting" in the posture P0 indicated by the posture information IM1 from the setting table TA1 shown in FIG. 6 (S110), and proceeds the processing to S114. When there is no previous setting, the information processing apparatus 100 acquires the setting content of the "default" in the posture P0 indicated by the posture information IM1 from the setting table TA1 shown in FIG. 6 (S112), and proceeds the processing to S114. The processing of acquiring the setting content can be, for example, processing of reading the setting content into the RAM 103. The processing of S108 to S112 is performed for all setting items SC2.

For example, it is assumed that the posture P0 indicated by the posture information IM1 is the tilt posture P1. In the setting table TA1 shown in FIG. 6, there is no "previous setting" for the "document waiting mode", the "document inclination correction", the "borderless", and the "double feed detection". Therefore, in both cases, the default first setting SE1 is acquired in the processing of S112.

Further, it is assumed that the posture P0 indicated by the posture information IM1 is the flat posture P2. In the setting table TA1 shown in FIG. 6, there is no "previous setting" for the "document waiting mode", the "document inclination correction", and the "double feed detection". Therefore, in both cases, the default second setting SE2 is acquired in the processing of S112. On the other hand, in the setting table TA1 shown in FIG. 6, the "borderless" has the "previous setting". Therefore, the previous second setting "ON (black)" is acquired in the processing of S110.

In S114, the information processing apparatus 100 displays, on the display portion 200, a UI screen in which the setting content acquired in S110 and S112 is reflected in the setting item SC2 included in the scan setting SC1. Here, the information processing apparatus 100 displays, on the display portion 200, the setting item SC2 indicating the first setting SE1 when the posture information IM1 indicates the tilt posture P1, and displays, on the display portion 200, the setting item SC2 indicating the second setting SE2 when the posture information IM1 indicates the flat posture P2.

For example, it is assumed that the posture P0 indicated by the posture information IM1 is the tilt posture P1 and the "document waiting mode" is "OFF" as shown in FIG. 6. In this case, as shown in the upper portion of FIG. 7, the first UI screen 301 having the document waiting item 322 indicating "OFF" is displayed. Further, it is assumed that the posture P0 indicated by the posture information IM1 is the flat posture P2 and the "document waiting mode" is "ON (continuous)" as shown in FIG. 6. In this case, as shown in the lower portion of FIG. 7, the second UI screen 302 having the document waiting item 322 indicating "ON (continuous)" is displayed.

When an operation of selecting an extended setting tab 330 shown in FIG. 7 by the input device 105 is performed, the information processing apparatus 100 displays, on the display portion 200, the UI screens 301 and 302 including items 331 to 333 when the extended setting tab is selected, as shown in FIG. 9. In FIG. 9, an inclination correction item 331, an edge erasing item 332, and a double feed detection item 333 are shown as examples of the setting item SC2. When the posture information IM1 indicates the tilt posture P1, the information processing apparatus 100 displays, on the display portion 200, the first UI screen 301 including the setting item SC2 indicating the first setting SE1 as shown in the upper portion of FIG. 9. When the posture information IM1 indicates the flat posture P2, the information processing apparatus 100 displays, on the display portion 200, the second UI screen 302 including the setting item SC2 indicating the second setting SE2 as shown in the lower portion of FIG. 9.

As described above, when the user physically switches the posture P0 of the main body 30 in the image reading apparatus 10, the setting content shown in the setting item SC2 of the scan setting SC1 is automatically switched to the setting content at the time of the previous document reading according to the posture P0. Therefore, when the user wants to use the previous setting contents as they are, the user can start the document reading without changing the setting contents of the setting item SC2.

Subsequently, the information processing apparatus 100 permits the change in the setting content shown in the setting item SC2 included in the UI screens 301 and 302 to be received (S116). The information processing apparatus 100 can receive an operation of changing "OFF" to "ON (continuous)" and an operation of changing "ON (continuous)" to "OFF" in the document waiting item 322 by the input device 105. The information processing apparatus 100 can receive an operation of changing "OFF" to "ON" and an operation of changing "ON" to "OFF" in the inclination correction item 331 by the input device 105. The information processing apparatus 100 can receive an operation of changing "OFF" to "ON (white)" or "ON (black)", an operation of changing "ON (white)" to "OFF" or "ON" (black), and an operation of changing "ON (black)" to "OFF" or "ON" (white) in the edge erasing item 332 by the input device 105. The information processing apparatus 100 can receive an operation of changing "OFF" to "ON" and an operation of changing "ON" to "OFF" in the double feed detection item 333 by the input device 105.

In the processing of S114, the posture P0 of the main body 30 may be switched after the setting content according to the posture P0 of the main body 30 is reflected in the setting item SC2. Therefore, when the posture change notification NO1 is received from the image reading apparatus 10 in the middle of the processing of S116, the information processing apparatus 100 returns the processing to S106.

For example, it is assumed that the first UI screen 301 matched with the tilt posture P1 is displayed in S114, and the image reading apparatus 10 transmits the posture change notification NO1 to the information processing apparatus 100. In this case, since the posture P0 of the main body 30 is switched from the tilt posture P1 to the flat posture P2, the image reading apparatus 10 transmits the posture information IM1 indicating the flat posture P2 to the information processing apparatus 100. The information processing apparatus 100 acquires the posture information IM1 indicating the flat posture P2 in the returned S106. By performing the processing of S108 to S114, the second UI screen 302 matched with the flat posture P2 is displayed. Therefore, as shown in FIGS. 7 and 9, when the posture P0 indicated by the posture information IM1 is switched from the tilt posture P1 to the flat posture P2, the setting item SC2 displayed on the display portion 200 is switched from the first setting SE1 to the second setting SE2. As described above, the setting item SC2 includes the document waiting item 322, the inclination correction item 331, the edge erasing item 332, and the double feed detection item 333.

Further, it is assumed that the second UI screen 302 matched with the flat posture P2 is displayed in S114, and the image reading apparatus 10 transmits the posture change notification NO1 to the information processing apparatus 100. In this case, since the posture P0 of the main body 30 is switched from the flat posture P2 to the tilt posture P1, the image reading apparatus 10 transmits the posture information IM1 indicating the tilt posture P1 to the information processing apparatus 100. The information processing apparatus 100 acquires the posture information IM1 indicating the tilt posture P1 in the returned S106. By performing the processing of S108 to S114, the first UI screen 301 matched with the tilt posture P1 is displayed. Therefore, as shown in FIGS. 7 and 9, when the posture P0 indicated by the posture information IM1 is switched from the flat posture P2 to the tilt posture P1, the setting item SC2 displayed on the display portion 200 is switched from the second setting SE2 to the first setting SE1.

As described above, when the posture P0 indicated by the posture information IM1 is switched, the setting item SC2 displayed on the display portion 200 is changed to the setting content according to the posture P0, which is stored in the setting storage section U3.

When the scan start button 340 is operated by the input device 105 on the UI screens 301 and 302 shown in FIGS. 7 and 9, the information processing apparatus 100 outputs the scan setting SC1 including the setting item SC2 to the image reading apparatus 10 and acquires the read image data DA1 from the image reading apparatus 10 (S118). The image reading apparatus 10 that has received the scan setting SC1 transports the document OR0 by the document transport section 21 and generates the read image data DA1 by reading the document OR0 in the reading section 20, according to the scan setting SC1, and transmits the read image data DA1 to the information processing apparatus 100. Therefore, the information processing apparatus 100 can acquire the read image data DA1 from the image reading apparatus 10.

For example, when the document waiting item 322 shown in FIG. 7 is "ON (continuous)", the image reading apparatus 10 that has received the scan setting SC1 including the document waiting item "ON" (continuous) causes the document transport section 21 to continue to be driven. When the document waiting item 322 is "OFF", the image reading apparatus 10 does not cause the document transport section 21 to continue to be driven.

When the inclination correction item 331 shown in FIG. 9 is "ON", the image reading apparatus 10 that has received the scan setting SC1 including the inclination correction item "ON" performs a process of correcting the inclination of the read image data DA1. Note that, the process of correcting the inclination of the read image data DA1 may be performed by the information processing apparatus 100 instead of the image reading apparatus 10. When the inclination correction item 331 is "OFF", the image reading apparatus 10 does not correct the inclination of the read image data DA1.

When the edge erasing item 332 shown in FIG. 9 is "ON (black)", the image reading apparatus 10 that has received the scan setting SC1 including the edge erasing item "ON (black)" performs a process of replacing the edge of the read image data DA1 with black. Note that, the process of replacing the edge of the read image data DA1 with a predetermined color may be performed by the information processing apparatus 100 instead of the image reading apparatus 10. When the edge erasing item 332 is "OFF", the image reading apparatus 10 does not replace the edge of the read image data DA1 with a predetermined color.

When the double feed detection item 333 shown in FIG. 9 is "ON", the image reading apparatus 10 that has received the scan setting SC1 including the double feed detection item "ON" causes the double feed detection section 29 to function. When the double feed detection item 333 is "OFF", the image reading apparatus 10 does not cause the double feed detection section 29 to function.

After outputting the scan setting SC1, the information processing apparatus 100 stores the setting content changed in S116 in the setting table TA1 (S120). Here, when the posture information IM1 indicates the tilt posture P1, the information processing apparatus 100 stores, as the first setting SE1, the change content shown in the setting item SC2 in the setting table TA1. When the posture information IM1 indicates the flat posture P2, the information processing apparatus 100 stores, as the second setting SE2, the change content shown in the setting item SC2 in the setting table TA1. Note that, the information processing apparatus 100 may store all the setting contents displayed in the setting item SC2 in the setting table TA1 as long as the setting contents shown in the setting item SC2 can be used for the next document reading. That is, when the first UI screen 301 is displayed, the information processing apparatus 100 may store, as the first setting SE1, all the setting contents displayed in the setting item SC2 in the setting table TA1. When the second UI screen 302 is displayed, the information processing apparatus 100 may store, as the second setting SE2, all the setting contents displayed in the setting item SC2 in the setting table TA1.

After storing the setting contents, the information processing apparatus 100 branches the processing depending on whether or not to continue reading the document OR0 (S122). When the reading of the document OR0 is continued, the information processing apparatus 100 returns the processing to S104. When the reading of the document OR0 is not continued, the information processing apparatus 100 ends the information processing shown in FIG. 8.

As described above, when the main body 30 of the image reading apparatus 10 is switched from the tilt posture P1 to the flat posture P2, the display of the scan setting SC1 is switched to the appropriate second setting SE2 as the flat posture P2. Further, when the main body 30 of the image reading apparatus 10 is switched from the flat posture P2 to the tilt posture P1, the display of the scan setting SC1 is switched to the appropriate first setting SE1 as the tilt posture P1. In particular, in the present specific example, the preferable scan setting SC1 such as the document waiting item 322, the inclination correction item 331, the edge erasing item 332, and the double feed detection item 333 shown in FIGS. 7 and 9 are switched to appropriate setting contents according to the switching of the posture P0. Therefore, according to the present specific example, the scan setting SC1 according to the inclination of the main body 30 can be easily performed.

4. Modification Example: in the present disclosure, various modification examples are conceivable.

For example, the plurality of postures of the main body may include postures other than the postures P1 and P2 described above. For example, assuming that an average inclination angle between the average inclination angle θ2 of the flat posture P2 and the average inclination angle θ1 of the tilt posture P1 is θ3, the plurality of postures P0 of the main body may include a semi-tilt posture of the inclination angle θ3. Of course, the plurality of postures of the main body may include the tilt posture P1 and the semi-tilt posture without the flat posture P2. Further, the main body may have a housing posture in which the document is not read, for example, a substantially vertical posture with an average inclination angle larger than the average inclination angle θ1 of the tilt posture P1.

The above processing can be changed as appropriate, such as by changing the order. For example, in the information processing of FIG. 8, the processing of S120 for storing the setting content can be performed before the processing of S118 for outputting the scan settings.

The setting item SC2 described above includes four types of items 322, 331, 332, and 333, but the setting items may be three types or less, or five types or more. For example, the setting items may be one to three types of items included in the items 322, 331, 332, and 333, or may include items not included in the items 322, 331, 332, and 333.

Incidentally, when the main body 30 is in the flat posture P2, the document OR0 that is easily torn, such as thin paper may be set on the feeding tray 26. Since such a document OR0 is easily torn when the document separating section 25 operates, as shown in FIG. 4, the image reading apparatus 10 includes the operation switching section 60 capable of switching the operation selection switch 60a to the third switching position 63 that keeps the document separating section 25 from operating. In particular, the document OR0 that is easily torn may be set on the feeding tray 26 in a state of being interposed between two transparent films. In this case, when the document separating section 25 operates, the transparent film may be separated and damaged.

Therefore, when the operation selection switch 60a is located at the first switching position 61 or the second switching position 62 where the document separating section 25 operates and the main body 30 is in the flat posture P2, it is preferable that the document waiting item 322 shown in FIG. 7 is not set to the second setting "ON (continuous)".

FIG. 11 schematically illustrates UI screen display control processing performed by the information processing apparatus 100 immediately after the UI screens 301 and 302 are displayed on the display portion 200 in S114 of FIG. 8.

When the UI screen display control processing starts, the information processing apparatus 100 requests the image reading apparatus 10 for the switching state information IM2 indicating the state of the operation switching section 60, and acquires the switching state information IM2 from the image reading apparatus 10 (S202). Next, the information processing apparatus 100 branches the processing depending on whether or not a document separation mode, that is, the state indicated by the switching state information IM2 is a state in which the document separating section 25 is operated (S204). When the operation selection switch 60a is in the third switching position 63, the switching state information IM2 indicates that the document separating section 25 is not operated. In this case, the information processing apparatus 100 ends the UI screen display control processing without performing the processing of S206 to S208, and leaves the UI screens 301 and 302 shown in FIGS. 7 and 9 as they are.

When the operation selection switch 60a is in the first switching position 61 or the second switching position 62, the information processing apparatus 100 branches the processing depending on whether or not the posture P0 indicated by the posture information IM1 is the flat posture P2 (S206). When the posture P0 indicated by the posture information IM1 is the tilt posture P1, the information processing apparatus 100 ends the UI screen display control processing without performing the processing of S208, and leaves the UI screens 301 and 302 shown in FIGS. 7 and 9 as they are.

When the posture P0 indicated by the posture information IM1 is the flat posture P2, as illustrated in the lower portion of FIG. 12, the information processing apparatus 100 prohibits the document waiting item 322 on the second UI screen 302 from being set to the second setting "ON (continuous)" (S208). In the second UI screen 302 shown in FIG. 12, the document waiting item 322 is set to the first setting "OFF" and is set to a gray background. Subsequently, the information processing apparatus 100 ends the UI screen display control processing.

As described above, when the state indicated by the switching state information IM2 indicates that the document separating section 25 is operated, and the posture P0 indicated by the posture information IM1 is the flat posture P2, it is prohibited to set the document waiting item 322 to the second setting SE2. As a result, the document waiting item 322 is not set to the second setting SE2 when the document separating section 25 operates. Therefore, the processing shown in FIG. 11 is a preferable example when the main body 30 of the image reading apparatus 10 includes the operation switching section 60 that switches whether or not to operate the document separating section 25.

5. Conclusion: as described above, according to the present disclosure, it is possible to provide a technology and the like capable of easily performing a scan setting according to the posture of the main body in various aspects. Of course, the basic operation and effect described above can be obtained even by the technology consisting only of the constituent elements according to Aspects 1, 9, and 10 described above.

In addition, it is also possible to implement a configuration in which the configurations disclosed in the above-described examples are mutually replaced or combinations are changed, a configuration in which the configurations disclosed in the known technology and the above-described examples are mutually replaced or the combinations are changed, and the like. The present disclosure also includes these configurations and the like.

What is claimed is:

1. An information processing apparatus that outputs a scan setting to an image reading apparatus including a main body having a plurality of postures, the main body reading a document according to the scan setting, the information processing apparatus comprising:
 a setting reception section configured to display a setting item included in the scan setting on a display portion and receive a change in a setting content shown in the setting item; and
 a posture acquisition section that acquires posture information indicating the posture of the main body from the image reading apparatus, wherein
 the setting reception section switches the setting item displayed on the display portion to the setting content according to the posture when the posture indicated by the posture information is switched.

2. The information processing apparatus according to claim 1, further comprising a setting storage section that stores the setting content according to the posture indicated by the posture information, the setting content being shown in the setting item, wherein the setting reception section switches the setting item displayed on the display portion to the setting content according to the posture when the posture indicated by the posture information is switched, the setting content being stored in the setting storage section.

3. The information processing apparatus according to claim 1, wherein the plurality of postures include a first posture and a second posture having a different inclination from the first posture, the information processing apparatus further comprises a setting storage section that stores the setting content shown in the setting item as a first setting when the posture information indicates the first posture, and that stores the setting content shown in the setting item as a second setting when the posture information indicates the second posture, and the setting reception section displays the setting item indicating the first setting on the display portion when the posture information indicates the first posture, and switches the setting item displayed on the display portion from the first setting to the second setting when the posture indicated by the posture information is switched from the first posture to the second posture.

4. The information processing apparatus according to claim 3, wherein the main body includes a reading section that reads the document, and a document transport section that transports the document to the reading section along a transport path passing through the reading section, the second posture has a smaller inclination angle of the transport path than the first posture, the setting item includes, as the second setting, a document waiting item indicating that the document transport section continues to be driven, and the setting reception section switches the document waiting item displayed on the display portion from the first setting to the second setting when the posture indicated by the posture information is switched from the first posture to the second posture.

5. The information processing apparatus according to claim 4, wherein the main body further includes a feeding tray, a document separating section that performs an operation of separating the document from a document bundle supported by the feeding tray, and an operation switching section that switches whether or not to operate the document separating section, and the setting reception section acquires switching state information indicating a state of the operation switching section from the image reading apparatus, and prohibits the document waiting item from being set to the second setting when the state indicated by the switching state information indicates that the document separating section is operated, and the posture indicated by the posture information is the second posture.

6. The information processing apparatus according to claim 3, wherein the main body includes a reading section that reads the document to generate read image data, and a document transport section that transports the document to the reading section along a transport path passing through the reading section, the second posture has a smaller inclination angle of the transport path than the first posture, the setting item includes, as the second setting, an inclination correction item indicating that an inclination of the read image data is corrected, and the setting reception section switches the inclination correction item displayed on the display portion from the first setting to the second setting when the posture indicated by the posture information is switched from the first posture to the second posture.

7. The information processing apparatus according to claim 3, wherein the main body includes a reading section that reads the document to generate read image data, and a document transport section that transports the document to the reading section along a transport path passing through the reading section, the second posture has a smaller inclination angle of the transport path than the first posture, the setting item includes, as the second setting, an edge erasing item indicating that an edge of the read image data is replaced with a predetermined color, and the setting reception section switches the edge erasing item displayed on the display portion from the first setting to the second setting when the posture indicated by the posture information is switched from the first posture to the second posture.

8. The information processing apparatus according to claim 3, wherein the main body includes a reading section that reads the document, a document transport section that transports the document to the reading section along a transport path passing through the reading section, and a double feed detection section that detects whether or not another document is overlapped with the document transported along the transport path, the second posture has a smaller inclination angle of the transport path than the first posture, the setting item includes, as the second setting, a double feed detection item indicating that the double feed detection section functions, and the setting reception section switches the double feed detection item displayed on the display portion from the first setting to the second setting when the posture indicated by the posture information is switched from the first posture to the second posture.

9. A non-transitory computer-readable storage medium storing an information processing program for outputting a scan setting to an image reading apparatus including a main body having a plurality of postures, the main body reading a document according to the scan setting, the information processing program causing a computer to realize:

a setting reception function of displaying a setting item included in the scan setting on a display portion and receiving a change in a setting content shown in the setting item; and a posture acquisition function of acquiring posture information indicating the posture of the main body from the image reading apparatus, wherein the setting reception function switches the setting item displayed on the display portion to the setting content according to the posture when the posture indicated by the posture information is switched.

10. An information processing method executed by a computer to perform processing of outputting a scan setting to an image reading apparatus including a main body having a plurality of postures, the main body reading a document according to the scan setting, the information processing method comprising:

a setting reception step of displaying a setting item included in the scan setting on a display portion and permitting a change in a setting content shown in the setting item to be received; and a posture acquisition step of acquiring posture information indicating the posture of the main body from the image reading apparatus, wherein the setting reception step includes switching the setting item displayed on the display portion to the setting content according to the posture when the posture indicated by the posture information is switched.

* * * * *